United States Patent
Julian et al.

(10) Patent No.: US 8,416,745 B2
(45) Date of Patent: Apr. 9, 2013

(54) OPEN-LOOP POWER ADJUSTMENT FOR CQI REPOINTING BASED ON RL QUALITY INDICATORS

(75) Inventors: David Jonathan Julian, San Diego, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 923 days.

(21) Appl. No.: 11/507,715

(22) Filed: Aug. 21, 2006

(65) Prior Publication Data

US 2007/0077956 A1 Apr. 5, 2007

Related U.S. Application Data

(60) Provisional application No. 60/756,980, filed on Jan. 5, 2006, provisional application No. 60/710,403, filed on Aug. 22, 2005.

(51) Int. Cl.
*H04W 4/00* (2009.01)
*H04B 7/00* (2006.01)
*H04B 7/216* (2006.01)

(52) U.S. Cl. .................. 370/332; 370/342; 455/522

(58) Field of Classification Search .................. 370/332, 370/342; 455/522
See application file for complete search history.

(56) References Cited

U.S. PATENT DOCUMENTS

| | | | |
|---|---|---|---|
| 6,181,738 B1 * | 1/2001 | Chheda et al. | 375/224 |
| 6,347,231 B1 | 2/2002 | Miya | |
| 6,628,958 B1 * | 9/2003 | Kamel et al. | 455/522 |
| 6,831,910 B1 | 12/2004 | Moon et al. | |
| 2002/0094782 A1 * | 7/2002 | Lin | 455/67.1 |
| 2003/0081572 A1 * | 5/2003 | Kim et al. | 370/332 |
| 2004/0192370 A1 | 9/2004 | Backes et al. | |
| 2004/0209636 A1 * | 10/2004 | Chen et al. | 455/522 |
| 2004/0242231 A1 * | 12/2004 | Tang et al. | 455/434 |
| 2004/0248606 A1 | 12/2004 | Suzuki et al. | |
| 2005/0043051 A1 | 2/2005 | Takano et al. | |
| 2005/0130664 A1 | 6/2005 | Sang et al. | |
| 2005/0227624 A1 | 10/2005 | Hiddink et al. | |

FOREIGN PATENT DOCUMENTS

| | | |
|---|---|---|
| CN | 1457565 A | 11/2003 |
| EP | 1179961 A1 | 2/2002 |
| EP | 1223769 | 7/2002 |

(Continued)

OTHER PUBLICATIONS

International Search Report—PCT/US2006/032763, International Search Authority—European Patent Office—Feb. 5, 2007.

(Continued)

*Primary Examiner* — Kamran Afshar
*Assistant Examiner* — Omoniyi Obayanju
(74) *Attorney, Agent, or Firm* — Howard Seo

(57) ABSTRACT

Systems and methodologies are described that facilitate performing scalable transmission power offsets for an access terminal to ensure that a listening base station can hear a signal transmitted from the access terminal. The power offset is generated as a function of a reverse link channel quality indicator feedback loop to permit the access terminal to adjust transmission power sufficiently without excessive power boosting, such as can occur under a static power-boosting scheme. Monitored parameters associated with channel quality indications may comprise erasure rate indicators provided by base stations in response to CQI signals from the access terminal, as well as mean received power levels associated with superframe preamble received at the access terminal.

43 Claims, 12 Drawing Sheets

FOREIGN PATENT DOCUMENTS

| | | |
|---|---|---|
| EP | 1458118 | 9/2004 |
| JP | 2003523689 | 8/2003 |
| JP | 2004080235 A | 3/2004 |
| JP | 2004147339 A | 5/2004 |
| JP | 2004518332 T | 6/2004 |
| KR | 100403727 | 10/2003 |
| WO | WO0161884 | 8/2001 |
| WO | WO02056505 A1 | 7/2002 |

OTHER PUBLICATIONS

Written Opinion—PCT/US2006/032763, International Search Authority—European Patent Office—Feb. 5, 2007.

International Preliminary Report on Patentability—PCT/US2006/032763, International Search Authority—The International Bureau of WIPO—Geneva, Switzerland—Feb. 26, 2008.

Translation of Office Action in Chinese application 200680039409.8 corresponding to U.S. Appl. No. 11/507,715, citing CN1457565 dated Feb. 21, 2011 (050975CN).

Translation of Office Action in Japanese application 2008-528068 corresponding to U.S. Appl. No. 11/507,715, citing JP2004518332, JP2003523689, JP2004147339 and JP2004080235 dated Feb. 15, 2011 (050975JP).

European Search Report—EP10010905, Search Authority—The Hague Patent Office, Apr. 18, 2011.

Philips: "Text Proposal for TR25.858 for power off sets for ACK/NACK commands", 3GPP Draft; R1-02-0045, 3rd Generation Partnership Project (3GPP), Mobile Competence Centre; 650, Route Des Lucioles; F-06921 Sophia-Anti Polis Cedex; France, vol. RAN WG1, no. Espoo, Finland; Jan. 12, 2002, XP050095631.

* cited by examiner

OPEN-LOOP POWER ADJUSTMENT FOR CQI REPOINTING BASED ON RL QUALITY INDICATORS

CLAIM OF PRIORITY UNDER 35 U.S.C. §119

This application claims the benefit of U.S. Provisional Application Ser. No. 60/710,403, entitled "OPEN-LOOP POWER ADJUSTMENT FOR CQI REPOINTING BASED ON RL QUALITY INDICATORS," filed on Aug. 22, 2005; and U.S. Provisional Application Ser. No. 60/756,980, entitled "METHOD OF POWER CONTROL WITH MEASUREMENTS OVER SUPERFRAME PREAMBLE," filed on Jan. 5, 2006, both assigned to the assignee hereof and hereby expressly incorporated by reference herein.

BACKGROUND

I. Field

The following description relates generally to wireless communications, and more particularly to improving transmission throughput in a wireless communication environment.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a user device. A user device within the coverage area of such base station can be employed to receive one, more than one, or all the data streams carried by the composite stream. Likewise, a user device can transmit data to the base station or another user device.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations.

Therefore, a need exists in the art for systems and methods that overcome the aforementioned deficiencies and facilitate reducing interference and conserving power in a wireless communication environment in order to improve system throughput and enhance user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to various aspects, access terminals may be provided with functionality that facilitates performing transmission power adjustment as a function of reverse link channel quality indicators in order to provide a more refined power adjustment scheme than is achievable using a static power boost protocol. For instance, conventional static power-boost mechanisms assign a preset power level by which an access terminal must increase transmission power for certain transmissions, regardless of whether the transmission requires power boosting. Thus, power may be wasted and interference on a reverse link may be unnecessarily increased. The subject innovation provides a more refined power adjustment scheme to reduce unwanted interference and conserve access terminal power.

According to an aspect, a method of performing transmission power adjustment for an access terminal in a wireless communication environment may comprise monitoring variations in a parameter of a signal received at the access terminal, and determining a scalable power offset factor that targets a given performance level. The signal may comprise channel quality index (CQI) signal erasure rate indicators from at least one base station in an active set of the access terminal and the parameter is an erasure rate experienced by the at least one base station. The scalable power offset factor may be determined as a function of a desired erasure rate and an erasure rate experienced by a base station to which the access terminal is requesting a handoff, and a handoff request may be transmitted at an assigned transmission power level multiplied by the scalable power offset factor. According to a related aspect, the signal may comprise superframe preamble information and the parameter may be a mean received power level of the superframe preamble. The method may further comprise comparing the mean received power level for a current superframe preamble to a mean received power level for a preceding superframe preamble, and adjusting transmission power level for access terminal transmissions by an amount proportional and opposite to a difference between the mean received power level of the current superframe preamble and the mean received power level of the preceding superframe preamble.

According to another aspect, an apparatus that facilitates scalably power-boosting a transmission power level for an access terminal in a wireless communication environment may comprise a receiver that receives a first signal, a processor that measures a parameter of the signal and determines a scalable power offset factor that targets a desired performance level, and a transmitter that transmits a second signal at an assigned transmission power level multiplied by the scalable power offset factor. The signal may comprise channel quality index (CQI) signal erasure rate indicators from at least one base station in an active set of the access terminal and the parameter may be an erasure rate experienced by the at least one base station. The processor may generate the scalable power offset factor as a function of a desired erasure rate and an erasure rate experienced by a base station to which the access terminal is requesting a handoff, and the transmitter may send a handoff request at an assigned transmission power level multiplied by the scalable power offset factor. According to a related aspect, the signal may comprise superframe preamble information and the parameter may be a mean received power level of the superframe preamble. The processor may compare a mean received power level for a current superframe preamble to a mean received power level for a preceding superframe preamble, and may adjust a transmission power level for access terminal transmissions by an amount equal and opposite to a difference between the mean received power level of the current superframe preamble and the mean received power level of the preceding superframe preamble.

According to still another aspect, a wireless communication apparatus may comprise means for monitoring variation in a parameter of a signal received at an access terminal, and means for generating a scalable power offset factor a targets a desired performance level. The means for monitoring monitors channel quality index (CQI) signal erasure rate indicators comprised by the signal from at least one base station in an active set of the access terminal and the means for generating the scalable offset power factor calculates an erasure rate experienced by the at least one base station as a function of the erasure rate indicators. The means for generating the scalable power offset factor generates the scalable power offset factor as a function of a desired erasure rate and an erasure rate experienced by a base station to which the access terminal is requesting a handoff, and a means for transmitting may send a handoff request at an assigned transmission power level multiplied by the scalable power offset factor. According to a related aspect, the signal may comprise superframe preamble information and the parameter may be a mean received power level of the superframe preamble. The means for generating the scalable power offset factor may compare the mean received power level for a current superframe preamble to a mean received power level for a preceding superframe preamble, and adjust a transmission power level for access terminal transmissions by an amount equal and opposite to a difference between the mean received power level of the current superframe preamble and the mean received power level of the preceding superframe preamble.

Yet another aspect relates to a computer-readable medium having stored thereon computer-executable instructions for monitoring variations in a channel-quality parameter associated with a signal received at an access terminal, and determining a scalable transmission power offset factor that targets a minimum performance level threshold. The signal may comprise channel quality index (CQI) signal erasure rate indicators from at least one base station in an active set of the access terminal and the parameter may be an erasure rate of the CQI signal at the at least one base station. The computer-readable medium may further comprise instructions for determining the scalable power offset factor as a function of a desired erasure rate and an erasure rate experienced by a base station to which the access terminal is requesting a handoff, and for transmitting a handoff request at an assigned transmission power level multiplied by the scalable power offset factor. According to a related aspect, the signal may comprise superframe preamble information and the parameter may be a mean received power level of the superframe preamble. The computer-readable may further comprise instructions for comparing a mean received power level for a current superframe preamble to a mean received power level for a preceding superframe preamble, and for adjusting transmission power level for access terminal transmissions by an amount equal and opposite to a difference between the mean received power level of the current superframe preamble and the mean received power level of the preceding superframe preamble.

According to still another aspect, a processor may execute computer-executable instructions for scalably adjusting transmission power for an access terminal in response to channel conditions, the instructions comprising monitoring variations in a channel-quality parameter associated with a signal received at an access terminal, and determining a scalable transmission power offset factor, as a function of the monitored variations, that targets a minimum performance level threshold. The signal may comprise channel quality index (CQI) signal erasure rate indicators from at least one base station in an active set of the access terminal and the parameter may be an erasure rate calculated as a function of the erasure rate indicators. The instructions may further comprise determining the scalable power offset factor as a function of a desired erasure rate and an erasure rate experienced by a base station to which the access terminal is requesting a handoff, and transmitting a handoff request at an assigned transmission power level multiplied by the scalable power offset factor. According to a similar aspect, the signal may comprise superframe preamble information and the parameter may be a mean received power level of the superframe preamble. The instructions may further comprise comparing the mean received power level for a current superframe preamble to a mean received power level for a preceding superframe preamble, and adjusting transmission power level for access terminal transmissions by an amount equal and opposite to a difference between the mean received power level of the current superframe preamble and the mean received power level of the preceding superframe preamble.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
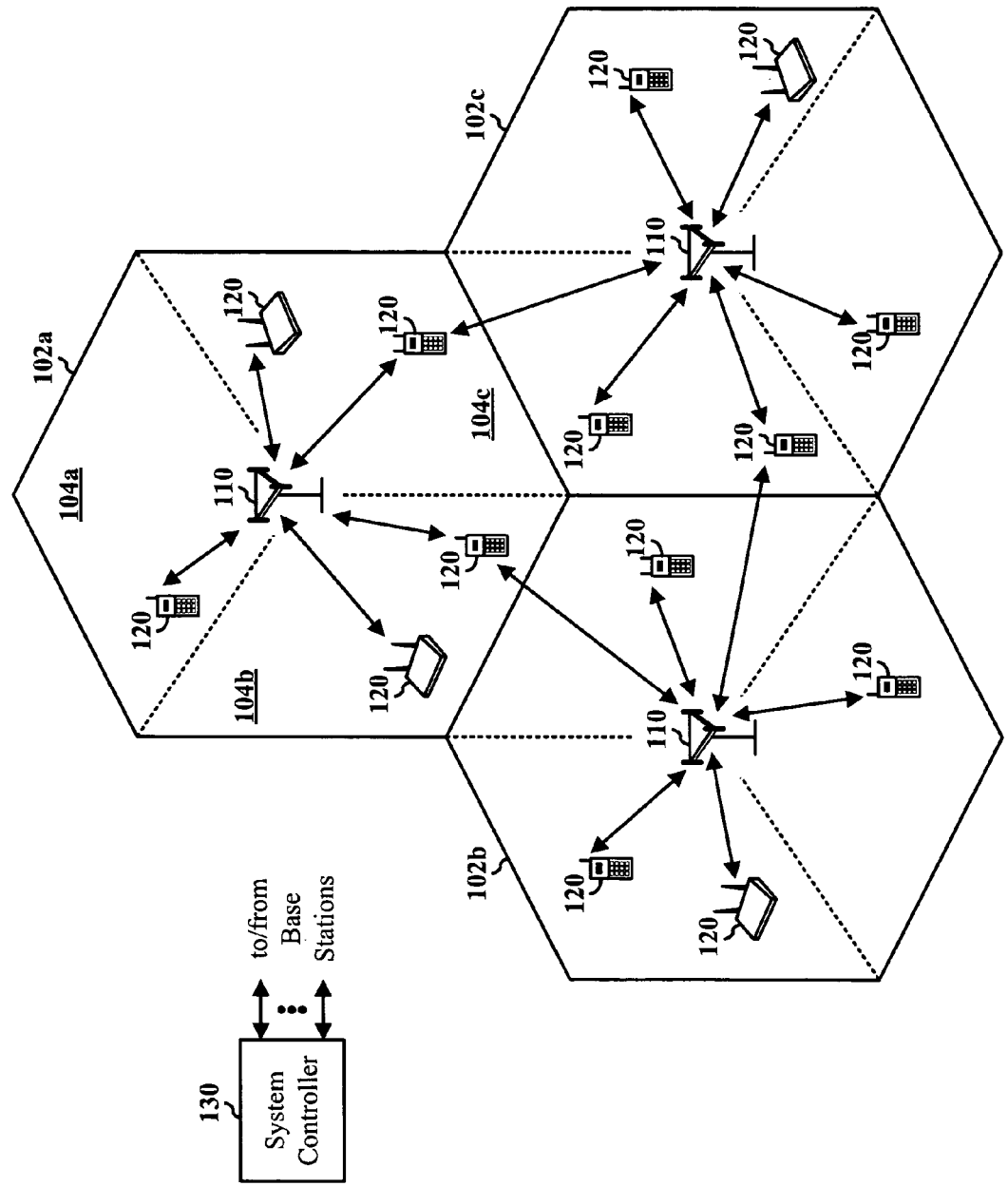
FIG. 1 illustrates a wireless communication system with multiple base stations and multiple terminals, in accordance with one or more aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any embodiment or design described herein as "exemplary" is not necessarily to be construed as preferred or advantageous over other embodiments or designs.

FIG. 1 illustrates a wireless communication system 100 with multiple base stations 110 and multiple terminals 120, which may be employed in conjunction with one or more aspects described herein. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas (e.g., three smaller areas), according to FIG. 1, 104a, 104b, and 104c. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, an access terminal, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

The data to be transmitted to access terminal 120 can be received by access network controller 130. Thereafter, access network controller 130 may send the data to all access points in the access terminal 120 active set. Alternatively, access network controller 130 may first determine which access point was selected by the access terminal 120 as the serving access point, and then send the data to the serving access point. The data can be stored in a queue at the access point(s). A paging message may then be sent by one or more access points to access terminal 120 on respective control channels. Access terminal 120 demodulates and decodes the signals on one or more control channels to obtain the paging messages.

In 1xEV-DO communication environments, an access terminal may have different serving sectors for forward and reverse link communication. The access terminal may indicate a desire to switch from one forward-link serving sector to another by transmitting a data rate control (DRC) signal with a cover (e.g., a scrambling code) corresponding to that of the desired forward-link serving sector. DRC power boosting is often desirable in order to improve detection of the DRC by the new/desired forward-link serving sector. Power boosting is particularly important when there is imbalance between the forward and reverse links. A static power-boosting factor may specified by a base station and is often chosen to accommodate a worst-case imbalance. A typical boosting factor is 5-6 dB. Often, a boosting factor of 5-6 dB is not necessary, as most imbalances tend to be fairly small. This leads to highly inefficient use of the terminal transmit power and unnecessarily high interference on the reverse link.

In accordance with various aspects, an access terminal may be provided with an estimate of reverse-link quality for each of a plurality of base stations in its active set. In the event that each base station transmits back an erasure indicator of each CQI/DRC transmission, the terminal may autonomously derive a scalable power-boosting factor that better matches the channel condition.

According to other aspects, reverse link control channel power control may be performed using closed loop algorithms, whereby an access point targets a certain performance for these channels and issues power control commands for each access terminal separately, instructing them to increase or decrease their transmit powers to meet the performance requirements. In an aspect, these power control commands are either erasure indications for the most recent transmissions of the CQI information from the access terminals, or up/down commands issued based on targeting a certain received carrier to interference ratio (C/I) on the reverse link CQI channels from the access terminals.

Figure 2:
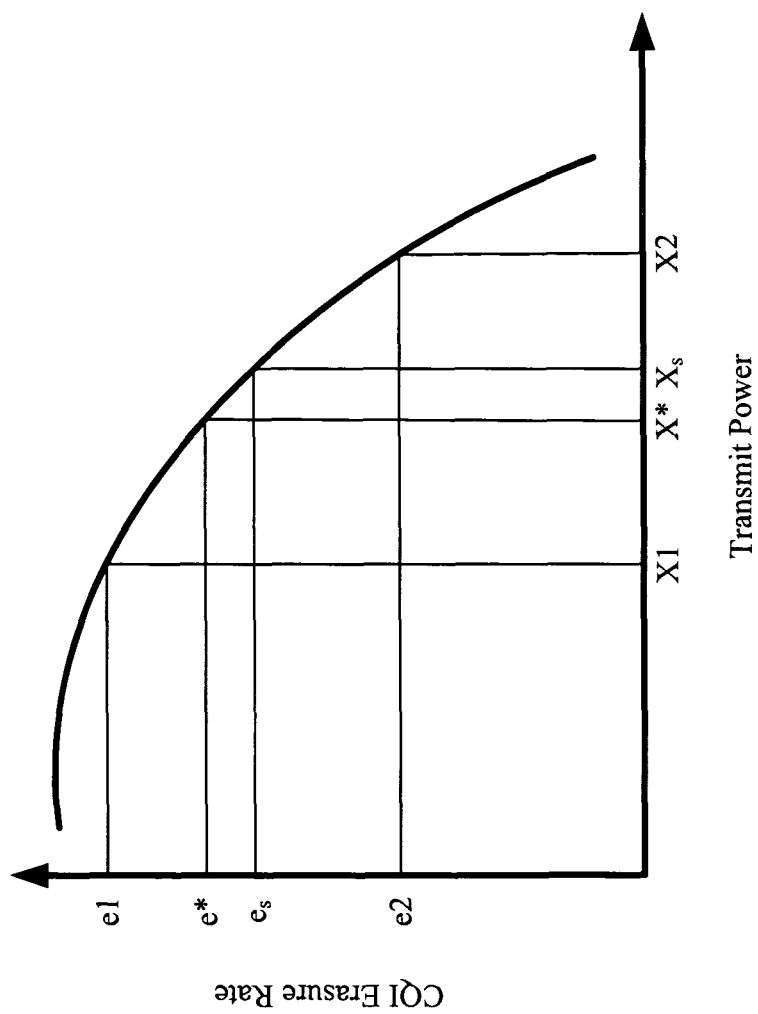
FIG. 2 illustrates a graphical representation of a relationship between erasure rate and transmit power for an access terminal, which may be utilized by the access terminal to determine an appropriate power boosting factor, in accordance with one or more aspects.

FIG. 2 illustrates a graphical representation 200 of a relationship between erasure rate and transmit power for an access terminal, which may be utilized by the access terminal to determine an appropriate power boosting factor, in accordance with one or more aspects. Based on the transmit power and estimated CQI erasure rates received from the base stations in the access terminal's active set, the terminal can derive an appropriate power offset to reach a desired target CQI erasure rate for each of the base stations. The terminal may have a priori knowledge of the relationship between the CQI performance (e.g., CQI erasure and error rates) as a function of the transmit power. This information may be obtained offline and made available by the base station (e.g., through an offline calibration of CQI erasure/error rate vs. SNR), obtained from empirical CQI erasure statistics, etc.

According to an example, the terminal may transmit a single CQI at a given time, and may be power-controlled by a current serving sector. Each base station in the terminal's active set may attempt to decode the CQI signal and may send back a resulting erasure indicator. The terminal may indicate a new desired serving sector by scrambling the CQI transmission with an appropriate scrambling sequence (e.g., a scrambling sequence associated with the new desired serving sector. According to the example, the terminal may be power controlled in such a way that the CQI erasure rate of $e_s$ is experienced at the current serving sector, which corresponds to a transmit power of $X_s$ for the terminal. If the terminal wishes to signal a handoff request to another base station that the terminal estimates to be experiencing a CQI erasure rate of e1 (e.g., the terminal can have a fairly reliable estimate of the CQI erasure rate to each of the base stations in its active set due to erasure rate indicators provided by the base stations, as well as by generating a sliding window estimate of an erasure rate as a function of the erasure indicators, which may be pre-generated for reverse link handoff decisions), and the terminal wishes to do so such that the resulting signaling erasure rate is smaller than e*, the terminal may apply a power offset of (X*/X1). That is, the terminal may transmit the CQI signal with a power level of $X_s(X^*/X1)$. In this manner, a more efficient use of transmit power may be implemented as compared to a technique that utilizes a fixed, or static, power offset, which may need to be sized for a worst-case imbalance.

In accordance with other aspects, the access terminal may efficiently adapt the transmit power offset under different channel conditions/imbalance to achieve a minimum acceptable reliability threshold. The technique is particularly useful in a deployment where a terminal only transmits a single CQI at any given time (e.g., as opposed to maintaining an independent CQI channel to each base station in the active set). Moreover, the terminal can trade off the signaling reliability as a function of the transmit power in a more granular manner than can be achieved using conventional methods. The terminal may additionally account for abrupt changes in erasure statistics during the power boost in order to accurately maintain the erasure statistics for each base station (e.g., by excluding abrupt changes in erasure values during the power boost from the statistics). Additionally, it will be appreciated that the subject innovation is not limited to CQI erasure rate, but may use other reverse link quality indicators, parameters, measurements, and the like.

Referring to FIGS. 3-8, methodologies relating to generating a scalable power boost factor for an access terminal based on one or more parameters associated with a signal from a base station in a wireless communication environment are illustrated. For example, methodologies can relate to power offset adjustment for an access terminal transmission in a frequency-division multiple access (FDMA) environment, an orthogonal frequency-division multiple access (OFDMA) environment, a data optimized (DO) environment, an evolution data optimized (EvDO) environment, a code-division multiple access (CDMA) environment, a wide-area code-division multiple access (WCDMA) environment, a time-division multiple access (TDMA) environment, a space-division multiple access (SDMA) environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 3:
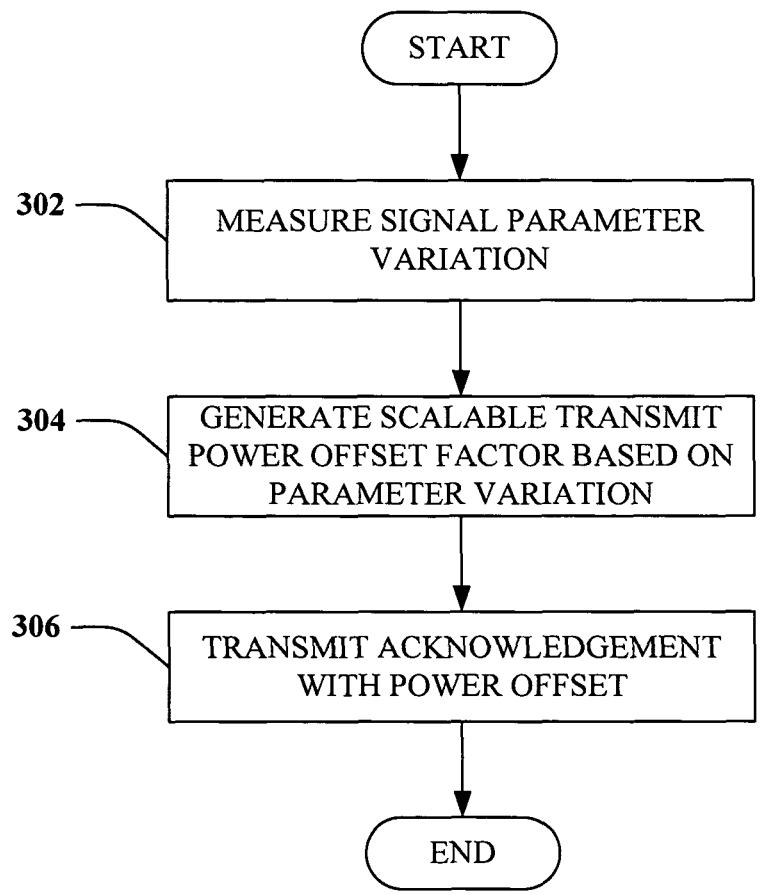
FIG. 3 is an illustration of a method of deriving a scalable power offset of an access terminal transmission, such as a data rate control (DRC) signal, in accordance with one or more aspects.

FIG. 3 is an illustration of a method 300 of deriving a scalable power offset of an access terminal transmission, such as a data rate control (DRC) signal, in accordance with one or more aspects. At 302, one or more parameters associated with a received signal may be analyzed to measure variations therein. The signal parameter may be, for example, a CQI erasure rate indicator such as described above, whereby the access terminal has an assigned transmission power level based on an erasure rate experienced by a serving sector for the access terminal. Additionally or alternatively, the parameter may be an indicator value (e.g., a bit value that, when set, triggers a transition time period for open-loop power level adjustment) that prompts a comparison of mean received power levels during a series of superframe preambles to detect variations therein.

At 304, a scalable transmission power level offset factor may be generated based on variation detected in the parameter. For instance, if the parameter is a CQI erasure rate associated with the access terminal, then at 304 the offset may be generated as described above with regard to the example set forth in the description of FIG. 2. In the event that the parameter is a mean power level during received superframe preambles, then the power offset factor may be derived based upon a comparison of a mean received power level for a current superframe preamble and a mean received power level for a most recent previous superframe preamble. If the measured change is above a predetermined threshold, then the power offset factor may be generated to compensate for the variation. Such aspects are described in greater detail below, with regard to FIGS. 7 and 8. At 306, a signal (e.g., an acknowledgment message, a DRC signal, . . . ) may be transmitted at a power level that is a product of the assigned transmit power of the access terminal and the generated power offset factor.

Figure 4:
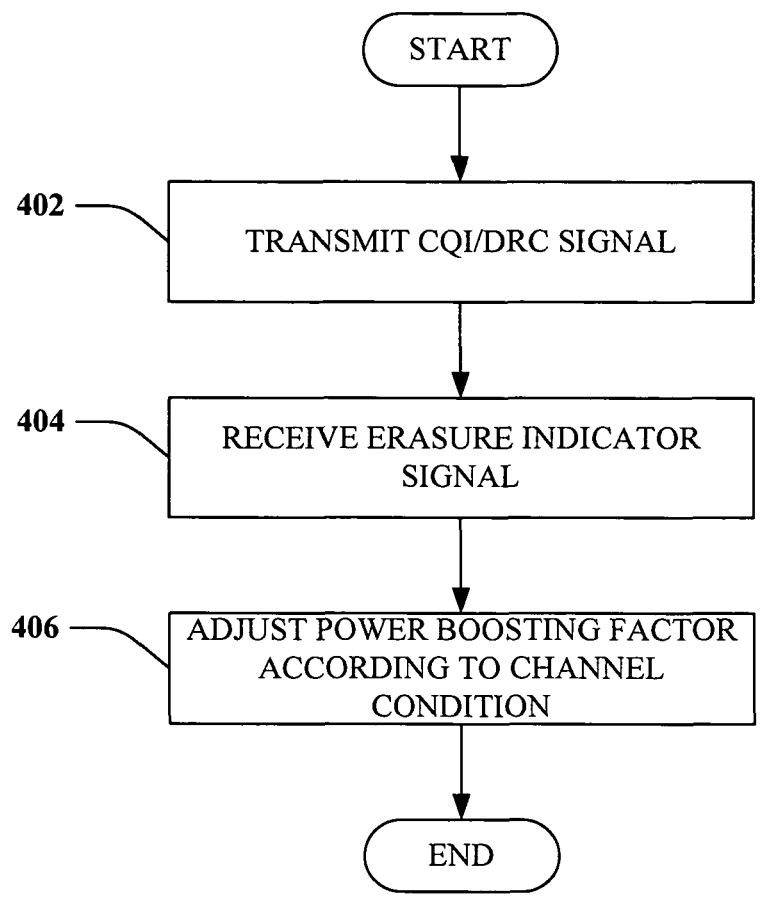
FIG. 4 illustrates a method of adjusting a power boost factor based on channel quality feedback, in accordance with one or more aspects described herein.

FIG. 4 illustrates a method 400 of adjusting a power boost factor based on channel quality feedback, in accordance with one or more aspects described herein. Method 400 facilitates mitigating wasteful power expenditure such as occurs when a serving sector or base station assigns a static power boost factor to an access terminal and forces the access terminal to transmit certain signals at the assigned boost factor. For example, a base station serving the access terminal may assign a 5 or 6 dB boost factor, obligating the access terminal to transmit acknowledgements, DRC signals, etc, at 5 or 6 dB above normal transmission power. However, an access terminal that only needs to boost a DRC transmission by, for instance, 1 or 2 dB to ensure that it is heard by the serving sector base station may still be required to boost at the 5-6 dB level, which in turn wastes transmission power and causes unnecessary interference on the reverse link. Thus, by providing an adjustable power boost that is scalable with channel conditions, method 400 may facilitate reducing interference and increasing power efficiency at an access terminal.

At 402, an access terminal may transmit a CQI/DRC signal to base stations listed in its active set. At 404, the access terminal may receive an erasure rate indicator from each base station in the active set, which the access terminal may utilize to facilitate generation of a power boosting factor. As used herein, power "boost" may be construed to mean power "offset" or power "adjustment", and is not limited to meaning an increase in power. Rather, in the event that a received erasure rate indicator suggests that an erasure rate is significantly below some target acceptable threshold, the access terminal may reduce transmit power and permit the erasure rate to be increased in order to save power. At 406, a power-boosting factor for the access terminal may be generated and/or adjusted according to the channel condition(s) indicated in the erasure rate indicator(s). For instance, the terminal can have a priori knowledge of a relationship between erasure rate and transmit power such as is detailed above with regard to FIG. 2. For instance, a lookup table stored in memory at the access table may delineate that a difference between a 50% erasure rate and an 80% erasure rate corresponds to approximately 3 dB. According to another example, a difference of 20% between two erasure rates may correspond to approximate 2.2 dB, or some other value. It will be appreciated that the foregoing examples are illustrative in nature and are not to be construed in a limiting sense.

Figure 5:
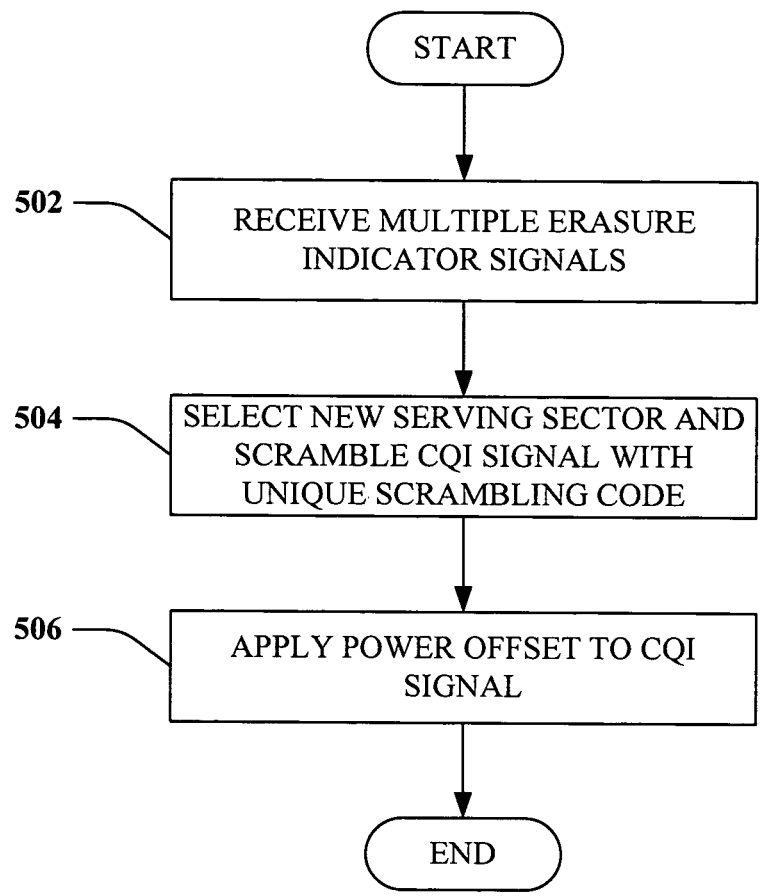
FIG. 5 is an illustration of a methodology for selecting a serving sector and adjusting a power offset factor for CQI and/or DRC signal transmission, in accordance with one or more aspects.

FIG. 5 is an illustration of a methodology 500 for selecting a serving sector and adjusting a power offset factor for CQI and/or DRC signal transmission, in accordance with one or more aspects. At 502, an access terminal may receive multiple erasure indicator signals (e.g., a signal from each base station in the access terminal's active set). For example, the terminal may transmit a single CQI at a given time, and may be power-controlled by a current serving sector. Each base station in the terminal's active set may attempt to decode the CQI and may send back an erasure indicator, which the access terminal receives at 502. The access terminal may select a new serving sector based on erasure rate indicators, and may scramble a CQI signal using a scrambling code unique to the selected serving sector. At 506, an adjustable power offset may be applied to a subsequent CQI/DRC signal transmitted from the access terminal.

The disjoint nature associated with having separate forward-link and reverse-link serving sectors can create obstacles when handing off from one serving sector to another. In the case of the reverse link, a terminal may typically hand off to a sector with a best reverse link relative to other sectors. In such cases, a negative power offset factor may be applied to facilitate reducing convergence time for reverse link power control after handoff. However, for forward-link serving sector handoffs, according to an example, terminal may be power controlled by a current serving sector so that a CQI erasure rate of $e_s$ is experienced at the current serving sector, which has a corresponding transmit power of $X_s$ (referring back to FIG. 2). If the terminal wishes to send a forward link handoff request to another base station that the terminal estimates to be experiencing a CQI erasure rate of e1 and desires a resulting signaling erasure rate is smaller than e*, the terminal may apply a power offset of (X*/X1), at 506. That is, the terminal may transmit the CQI signal with power level $X_s(X^*/X1)$.

According to another example, if the terminal requests a forward link handoff to a base station which the terminal estimates to be experiencing a CQI erasure rate of e2, which may suggest that the new base station actually has a better reverse link, the terminal may transmit at the same power (e.g., the resulting CQI erasure rate seen at the new base station is still e2<e*), or may scale down the transmit power by X2/X* to achieve a CQI erasure rate of e*.

Figure 6:
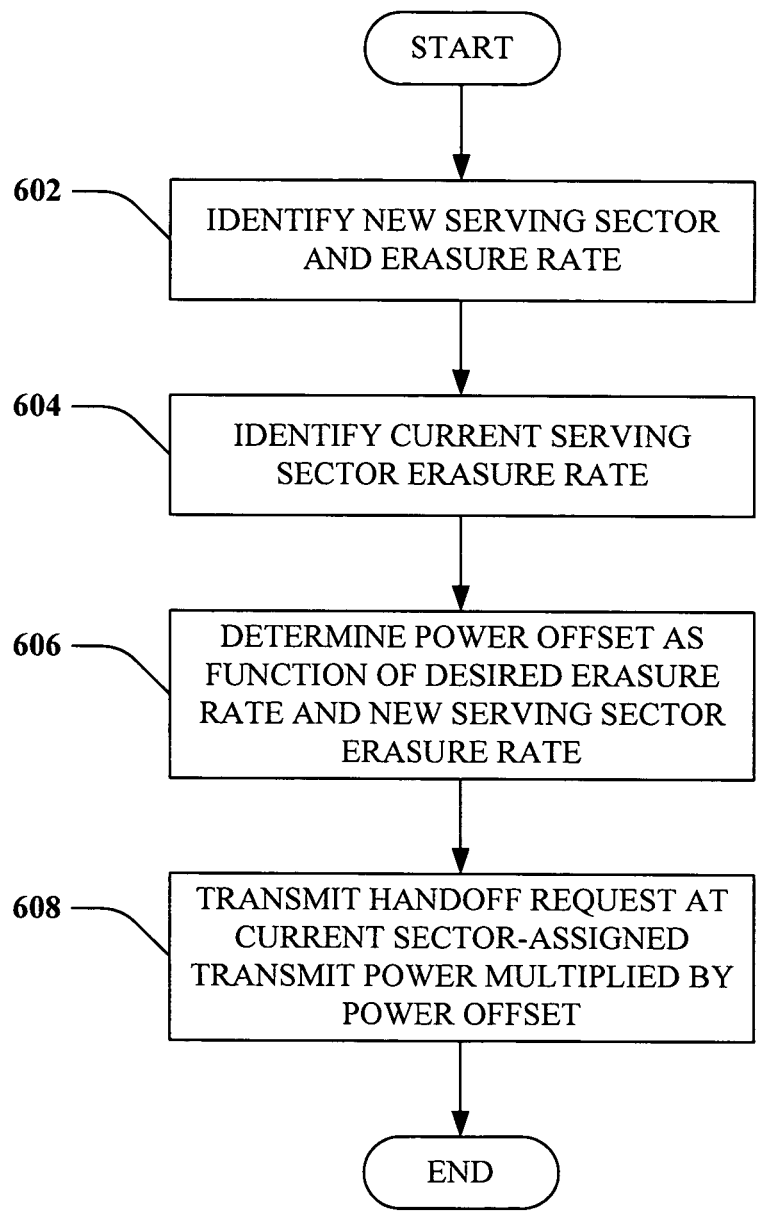
FIG. 6 is an illustration of a method that facilitates determining a power offset factor as a function of a desired erasure rate and an erasure rate associated with a new serving sector to which an access terminal is requesting a handoff, in accordance with one or more aspects.

FIG. 6 is an illustration of a method 600 that facilitates determining a power offset factor as a function of a desired erasure rate and an erasure rate associated with a new serving sector to which an access terminal is requesting a handoff, in accordance with one or more aspects. According to the method, at 602, a serving sector to which an access terminal desires handoff may be identified, based on an erasure rate indication received at the access terminal. The access terminal may additionally identify an erasure rate for a current serving sector, at 604, based on an erasure rate indicator the access terminal has received from the current serving sector (e.g., in response to a CQI/DRC message transmitted by the access terminal). A power offset that the access terminal may employ when transmitting a handoff request message may be derived at 606. For example, the power offset factor may be a function of a transmission power correlated to the desired erasure rate and a transmission power correlated to the erasure rate of the new serving sector. The handoff request may then be transmitted, at 608, at transmission power level assigned by the current serving sector, multiplied by the power offset factor, to ensure that the new serving sector, to which the access terminal is to be handed off, is able to hear the request. In this manner, method 600 facilitates determining a power offset factor that is scaled to a transmission power need during a given transmission event, while reserving excess transmission power to mitigate interference on a reverse link and to conserve power at the access terminal.

Figure 7:
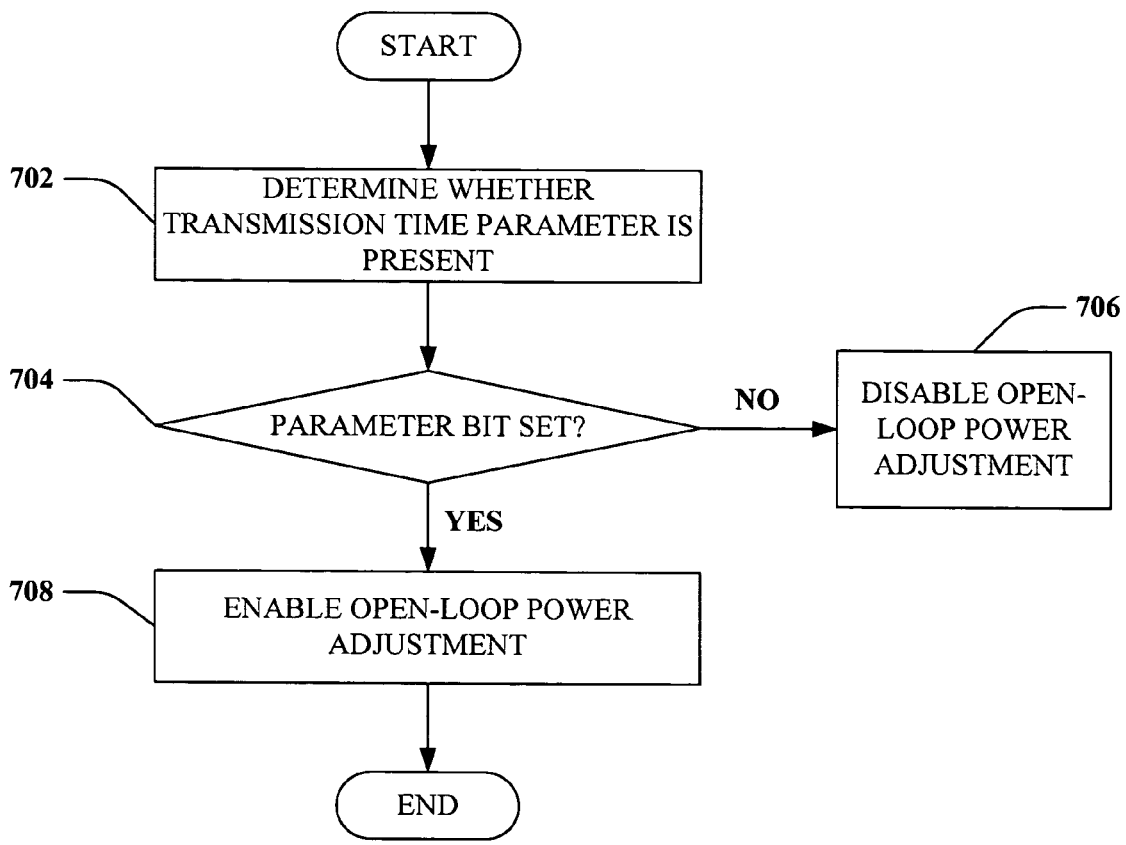
FIG. 7 is an illustration of a method that facilitates determining whether to perform transmission power control, in accordance with one or more aspects.

FIG. 7 is an illustration of a method 700 that facilitates determining whether to perform transmission power control, in accordance with one or more aspects. Open-loop method 700 may facilitate mitigating certain channel conditions under which a closed-loop power control algorithm is not able to catch up with channel variations. An example of such a scenario is "shadowing," which occurs where a main communication path between an access terminal and its serving sector is blocked by a large obstacle, such as a building (e.g., due to the mobility of the access terminal), and the forward and reverse link channel qualities are severely degraded over a short time period. In such a scenario, the access terminal may need a faster rise in its output power than achievable by the closed loop commands, and it may also miss several power control commands due to the severe degradation of its forward link channel quality. In such scenarios, an open-loop power adjustment algorithm in which the access terminal adjusts its transmit power based on the changes it observes on the received signal strength may be more useful. In some systems, the base station does not transmit a pilot channel at all times (e.g. in every physical layer frame). In such systems, the measurement may be carried out only at times where such a pilot is likely to be available. For instance, in the 802.20 context, the measurement may be carried out only over the superframe preamble of the reverse link serving sector.

At 702, a determination may be made regarding whether a transmission time parameter is present. The transmission time parameter may be a parameter associated with a change in a measured attribute of a received signal. At 704, a determination may be made regarding whether a parameter bit value is set, which indicates that a power adjustment protocol should be enabled. If the parameter bit value is not set (e.g., has a value of zero), then an open-loop power adjustment protocol may be disabled at 706, and the access terminal may continue to follow power control commands it receives from a reverse link serving sector. If the parameter bit value is set (e.g., has a non-zero value), then the value of the bit may be interpreted by the access terminal to indicate a transmission time for one or more open-loop power adjustments, which may be enabled at 708.

Figure 8:
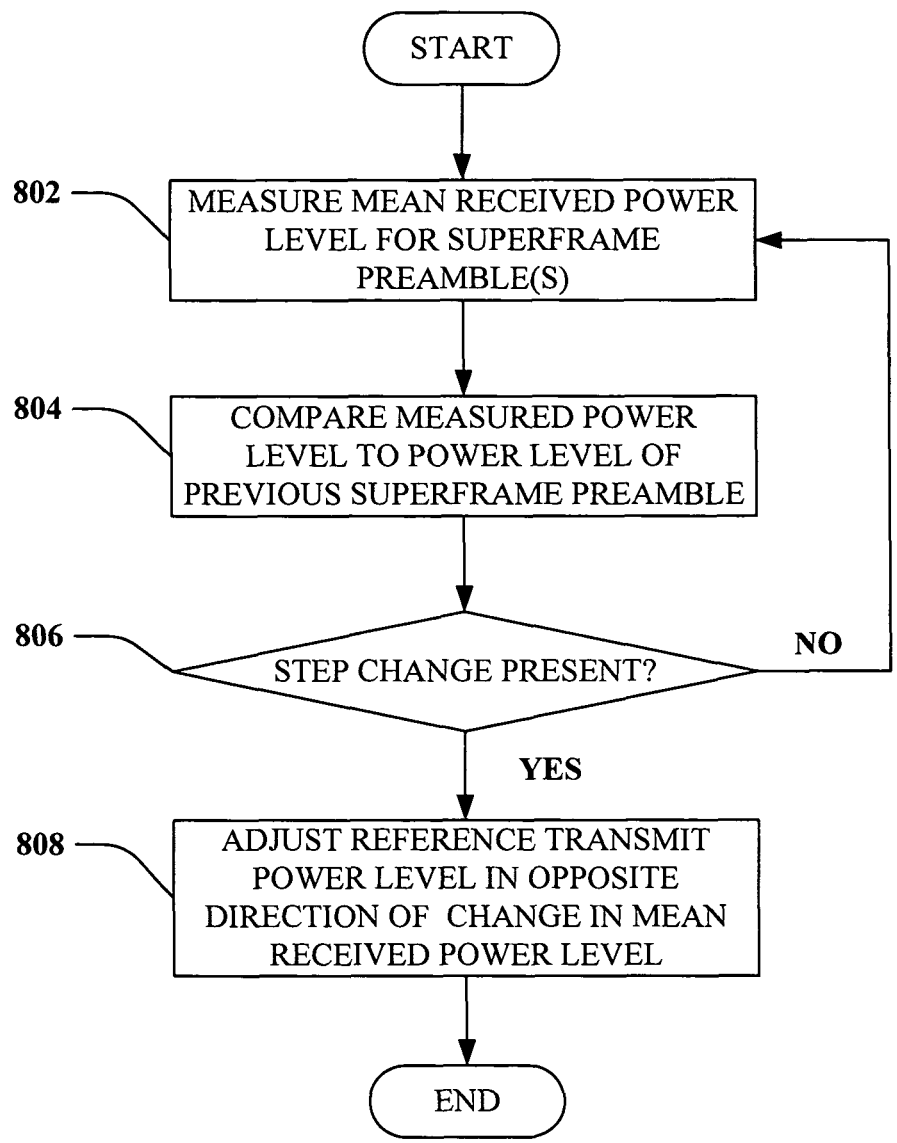
FIG. 8 is an illustration of a method that facilitates performing a power adjustment protocol based on a comparison of mean receive power among superframe preambles at an access terminal, in accordance with one or more aspects.

FIG. 8 is an illustration of a method 800 that facilitates performing a power adjustment protocol based on a comparison of mean receive power among superframe preambles at an access terminal, in accordance with one or more aspects. According to an aspect, a negotiated configuration attribute, OpenLoopTransitionTime, may designate a transition time for the open loop power adjustments at the access terminal. When this parameter is set to zero, the open loop power control is disabled and the access terminals are forced to follow the power control commands they receive from their reverse link serving sector to adjust their transmit power to that sector, as described above with regard to FIG. 7. When this parameter is set to a non-zero value, it specifies the transition time for open loop adjustments. For example, the access terminal may measure the mean received power during each superframe preamble of its reverse link serving sector, at 802. The access terminal may then compare the mean received power to a measurement on the previous superframe preamble of its reverse link serving sector, at 804. At 806, a determination may be made regarding whether a step change is present between the measurements. If no step change is detected upon the comparison at 806, then the method may revert to 802 for further monitoring, etc. If a step change in the mean received power is detected, the access terminal may adjust its reference transmit power level to the reverse link serving sector (and possibly other synchronous subsets in the active set) by an inversely proportional amount that is approximately correlated to change in the mean received power, and in the opposite direction to that change, at 808. For example, if the mean received power level is determined to have been approximately halved relative to that of a previous superframe preamble, then the transmit power level to the reverse link serving sector may be approximately doubled. Additionally, power adjustment may be performed using a linear transition from the current power level to the target power level over a time period specified by OpenLoopTransitionTime. If multiple changes are measured during one OpenLoopTransitionTime, their effects on the power level may be accumulated.

According to another example, if the mean received power for a current preamble is 3 dB less than a preceding preamble, then the power adjustment may comprise boosting transmit power by approximately 3 dB. Conversely, if the mean received power of a current superframe preamble is 2 dB greater than a preceding superframe preamble, then the access terminal may reduce it's transmit power by 2 dB. In the former case, it may be presumed that the access terminal is experiencing a diminished signal (e.g., due to increased shadowing by an obstacle between the access terminal and the serving sector, increased distance from the serving sector, etc.) from the serving sector to which it is transmitting, and thus a negative change in mean preamble receive power is perceived, which is in turn compensated for by a power boost. In the latter case, the access terminal may be approaching the serving sector base station and thus perceives a positive change in mean preamble receive power, which may permit the access terminal to respond by reducing transmit power. According to some aspects, data portions of a transmission need not be power-boosted, but rather only a CQI channel that targets a desired forward link serving sector may be subject to power boost by the power offset factor. According to other aspects, reverse-link data channels may be boosted by the power offset factor after reverse-link handoff. This, in turn, facilitates conserving power at the access terminal and reducing interference on the reverse link.

According to still other aspects, it may be desirable to allow closed loop power control to take care of most situations, and employ open loop power adjustment to compensate for situations where a radio link may be lost for a short period of time without it. In such instances, the open loop power adjustment may be applied when the received power level drops by more than a predetermined threshold amount, measured in dB.

Figure 9:
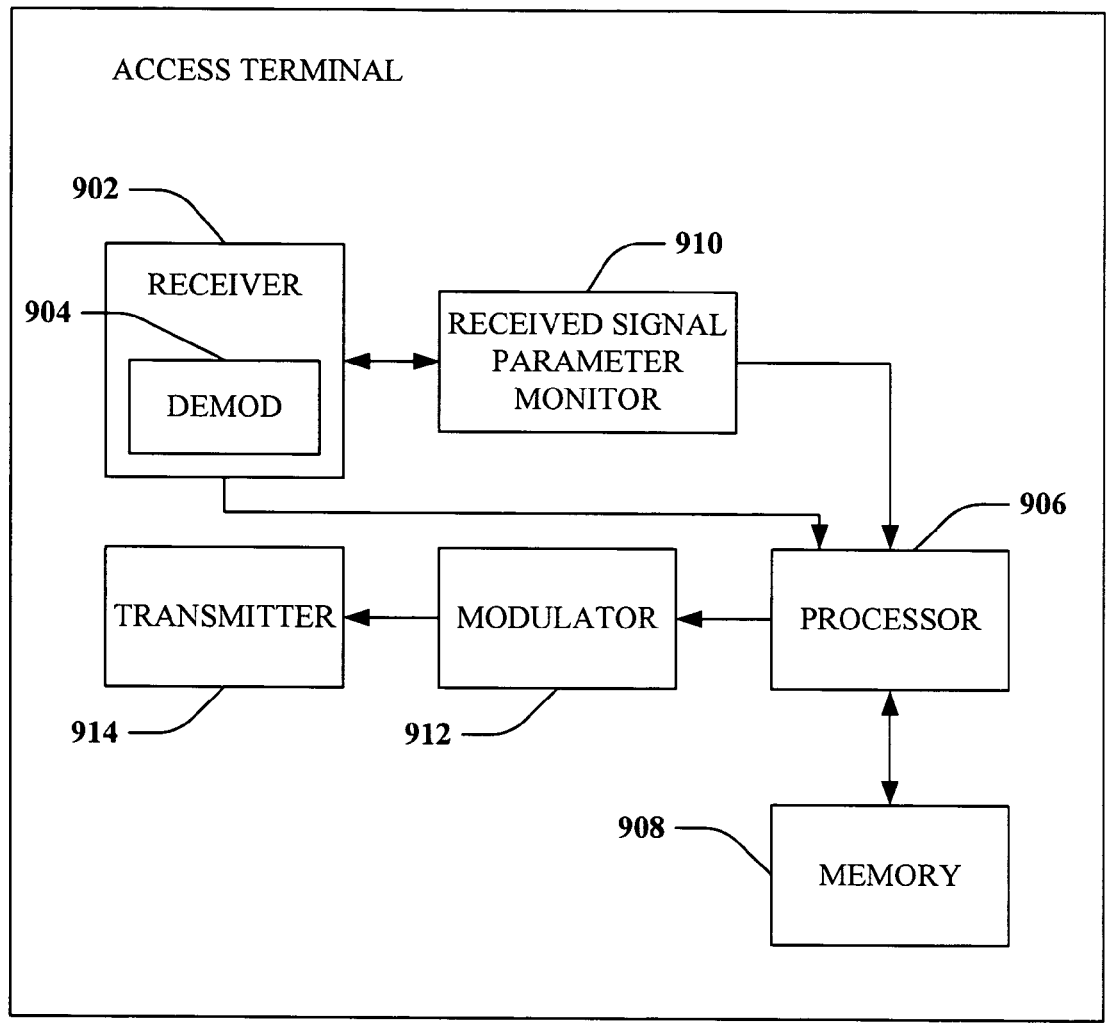
FIG. 9 is an illustration of an access terminal that facilitates generating a scalable power offset factor with which to boost transmission power based on reverse link channel quality, in accordance with one or more aspects.

FIG. 9 is an illustration of an access terminal 900 that facilitates generating a scalable power offset factor with which to boost transmission power based on reverse link channel quality, in accordance with one or more aspects. Access terminal 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can comprise a demodulator 904 that may demodulate received symbols and provide them to a processor 906 for channel estimation. Processor 906 may be a processor dedicated to analyzing information received by receiver 902 and/or generating information for transmission by a transmitter 914, a processor that controls one or more components of access terminal 900, and/or a processor that both analyzes information received by receiver 902, generates information for transmission by transmitter 914, and controls one or more components of access terminal 900.

Access terminal 900 can additionally comprise memory 908 that is operatively coupled to processor 906 and that may store data to be transmitted, received data, pilot information, and the like. Memory 908 may store information related to CQI/DRC signals, erasure rate indications received from one or more base stations in the access terminal's active set, base station identity information, protocols for monitoring parameters associated with reverse link channel quality (e.g., erasure rate indicators, mean received power levels of superframe preambles, ...), protocols for generating a power offset factor based on the monitored parameters, etc.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Receiver 902 is further operatively coupled to a received signal parameter monitor 910, which may monitor received signals to glean information that may be utilized by processor 906 to generate an appropriate power offset factor, etc. For example, received signal parameter monitor 910 may monitor erasure rate indicators to facilitate performing the various methods described above with regard to FIGS. 2-6, mean received signal power levels for superframe preambles to facilitate comparisons by processor 906, as described above with regard to FIGS. 7 and 8, etc. Access terminal 900 still further comprises a modulator 912 and a transmitter 914 that transmits a signal to, for instance, one or more base stations, another user device, a remote agent, etc. Although depicted as being separate from the receiver 902 and the processor 906, it is to be appreciated that received signal parameter monitor 910 may be part of processor 906 or a number of processors (not shown), and/or may be integral receiver 902.

Figure 10:
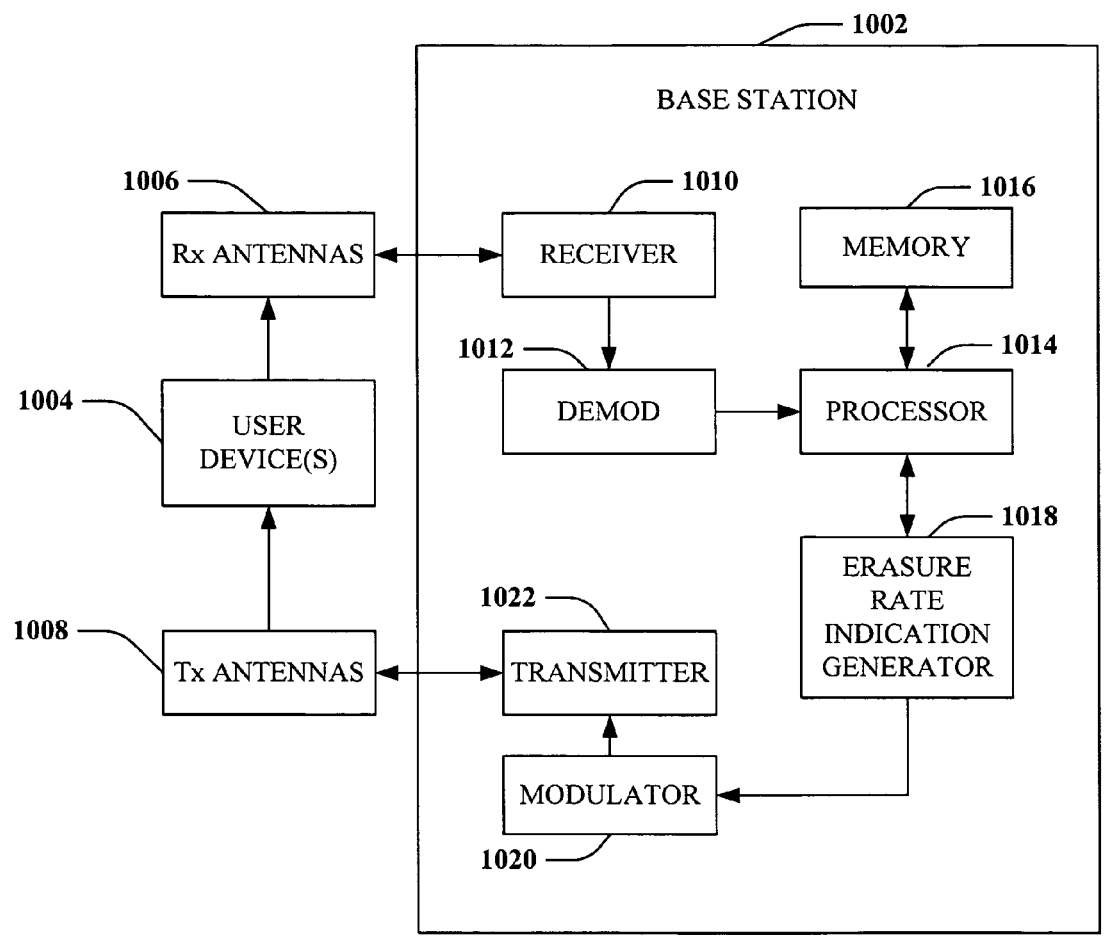
FIG. 10 is an illustration of a system that facilitates providing reverse link channel quality information to an access terminal to permit generation of a scalable power offset factor in order to conserve transmission power and reduce interference, in accordance with one or more aspects.

FIG. 10 is an illustration of a system 1000 that facilitates providing reverse link channel quality information to an access terminal to permit generation of a scalable power offset factor in order to conserve transmission power and reduce interference, in accordance with one or more aspects. System 1000 comprises a base station 1002 with a receiver 1010 that receives signal(s) from one or more user devices 1004 through a plurality of receive antennas 1006, and a transmitter 1022 that transmits to the one or more user devices 1004 through a transmit antenna 1008. Receiver 1010 may receive information from receive antennas 1006 and is operatively associated with a demodulator 1012 that demodulates received information. Demodulated symbols are analyzed by a processor 1014 that may be similar to the processor described above with regard to FIG. 9, and which is coupled to a memory 1016 that stores information related to erasure rates for various access terminals in whose active sets the base station is listed, and/or any other suitable information related to performing the various actions and functions set forth herein.

Processor 1014 may be further coupled to an erasure rate indication generator 1018, which may generate erasure rate information for an access terminal based on analysis of a CQI/DRC signal from the access terminal. Erasure rate indication generator 1018 may be further coupled to a modulator 1020. Modulator 1020 may modulate/multiplex communication signals for transmission by a transmitter 1022 through antenna 1008 to user device(s) 1004. Although depicted as being separate from processor 1014, it is to be appreciated that erasure rate indication generator 1018 and/or modulator 1020 may be part of processor 1014 or may be a number of processors (not shown).

Figure 11:
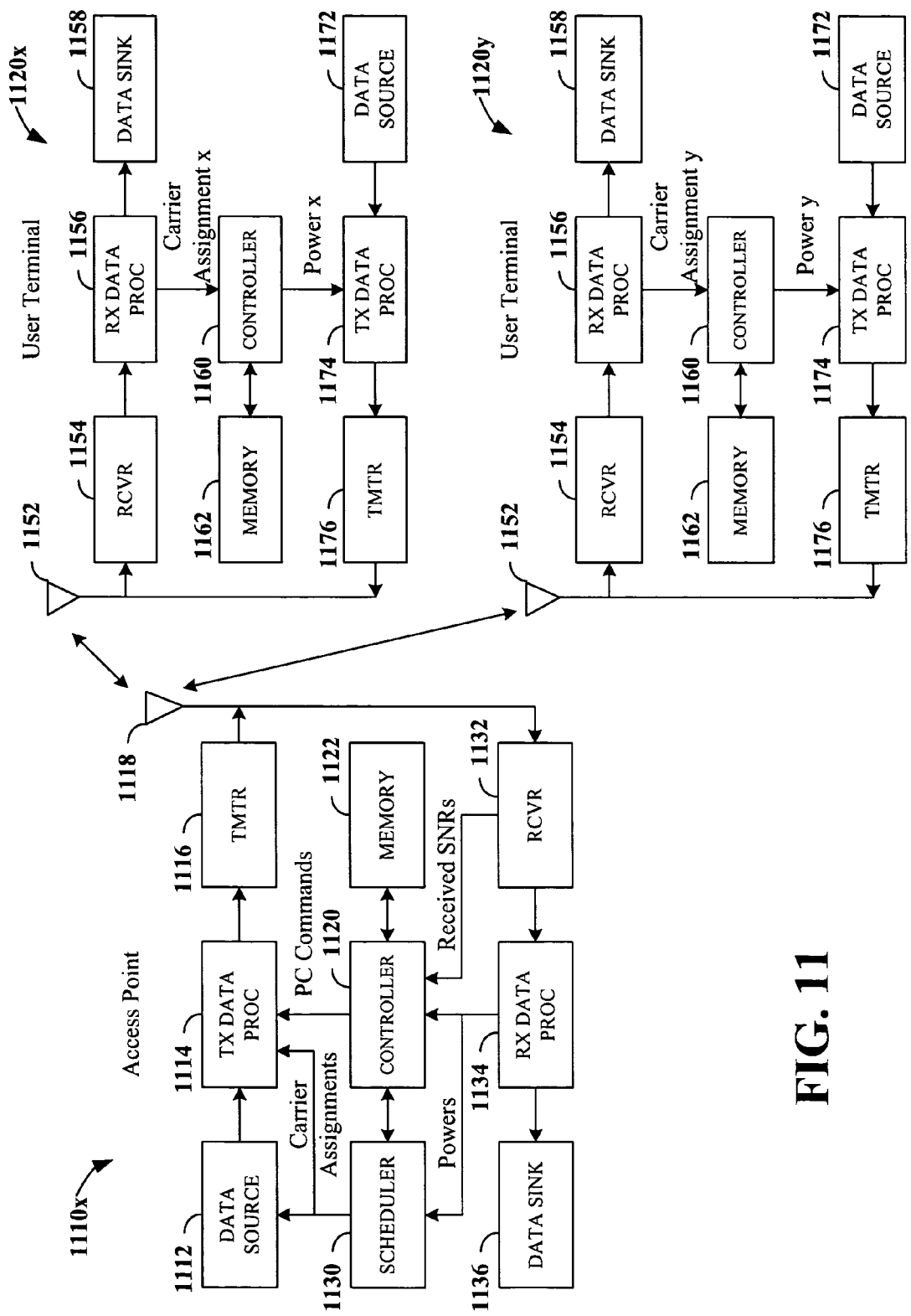
FIG. 11 illustrates an exemplary wireless communication system.

FIG. 11 shows an exemplary wireless communication system 1100. The wireless communication system 1100 depicts one base station and two terminals for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1, 2, 9, 10, and 12) and/or methods (FIGS. 3-8) described herein to facilitate wireless communication there between.

FIG. 11 shows a block diagram of an embodiment of an AP 1110x and two ATs 1120x and 1120y in multiple-access multi-carrier communication system. At AP 1110x, a transmit (TX) data processor 1114 receives traffic data (e.g., information bits) from a data source 1112 and signaling and other information from a controller 1120 and a scheduler 1130. For example, controller 1120 may provide power control (PC) commands that are used to adjust the transmit power of the active ATs, and scheduler 1130 may provide assignments of carriers for the ATs. These various types of data may be sent on different transport channels. TX data processor 1114 encodes and modulates the received data using multi-carrier modulation (e.g., OFDM) to provide modulated data (e.g., OFDM symbols). A transmitter unit (TMTR) 1116 then processes the modulated data to generate a downlink-modulated signal that is then transmitted from an antenna 1118.

At each of ATs 1120x and 1120y, the transmitted and modulated signal is received by an antenna 1152 and provided to a receiver unit (RCVR) 1154. Receiver unit 1154 processes and digitizes the received signal to provide samples. A received (RX) data processor 1156 then demodulates and decodes the samples to provide decoded data, which may include recovered traffic data, messages, signaling, and so on. The traffic data may be provided to a data sink 1158, and the carrier assignment and PC commands sent for the terminal are provided to a controller 1160. Controller 1160 may be configured to carryout the schemes describe above.

For each active terminal 1120, a TX data processor 1174 receives traffic data from a data source 1172 and signaling and other information from controller 1160. For example, controller 1160 may provide information indicative of the required transmit power, the maximum transmit power, or the difference between the maximum and required transmit powers for the terminal. The various types of data are coded and modulated by TX data processor 1174 using the assigned carriers and further processed by a transmitter unit 1176 to generate an uplink modulated signal that is then transmitted from antenna 1152.

At AP 1110x, the transmitted and modulated signals from the ATs are received by antenna 1118, processed by a receiver unit 1132, and demodulated and decoded by an RX data processor 1134. Receiver unit 1132 may estimate the received signal quality (e.g., the received signal-to-noise ratio (SNR)) for each terminal and provide this information to controller 1120. Controller 1120 may then derive the PC commands for each terminal such that the received signal quality for the terminal is maintained within an acceptable range. RX data processor 1134 provides the recovered feedback information (e.g., the required transmit power) for each terminal to controller 1120 and scheduler 1130.

The techniques described herein may be implemented by various means. For example, these techniques may be implemented in hardware, software, or a combination thereof. For a hardware implementation, the processing units (e.g., controllers 1120 and 1170, TX and RX processors 1114 and 1134, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 12:
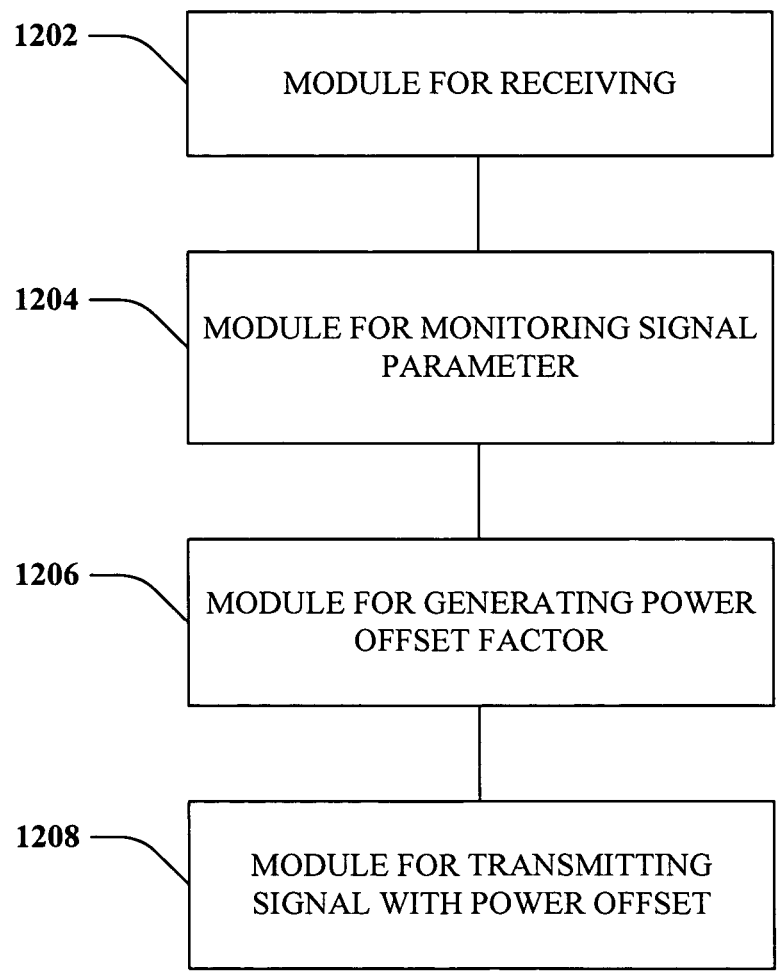
FIG. 12 illustrates an apparatus that facilitates generating a scalable power offset factor to adjust a transmission signal from an access terminal in a wireless communication environment, in accordance with various aspects.

FIG. 12 illustrates an apparatus 1200 that facilitates generating a scalable power offset factor to adjust a transmission signal from an access terminal in a wireless communication environment, in accordance with various aspects. Apparatus 1200 is represented as a series of interrelated functional blocks, or "modules," which can represent functions implemented by a processor, software, or combination thereof (e.g., firmware). For example, apparatus 1200 may provide modules for performing various acts such as are described above with regard to the preceding figures. Apparatus 1200 comprises a module for receiving 1202 that may receive information from a base station, wherein the information is related to reverse link channel quality. For instance, the module for receiving 1202 may receive an erasure rate indication that described an erasure rate for a CQI/DRC signal transmitted by an access terminal in which apparatus 1200 is employed. Additionally or alternatively, the module for receiving may receive other signals from one or more base stations listed in an active set of the user device, portions of which (e.g., superframe preambles, etc.) may be analyzed to facilitate generation of a power offset factor.

Apparatus 1200 may further comprise a module for monitoring signal parameters 1204, which may monitor erasure rate indications, and/or may measure mean received power for superframe preambles in signals received from one or more base stations. Erasure rate indication information may be correlated to transmission power levels (e.g., by performing a table lookup or the like) to permit a module for generating a power offset factor 1206 to derive an appropriate power off set factor by which to multiple a transmission power assigned to the access terminal by a current serving sector. A means for transmitting 1208 may then transmit a handoff request to a new serving sector at its assigned transmission power, multiplied by the power offset factor, to ensure that the new serving sector to which the access terminal is requesting handoff can hear the request. According to another aspect, module for generating a power offset factor 1306 may compare a mean received power level for a current superframe preamble to that of a preceding superframe preamble, and may generate the power offset factor based on a difference there between. Module for transmitting 1308 may then transmit a signal at an assigned power level multiplied by the offset factor to ensure that a target base station hears the signal. It will be appreciated that the various modules described herein may comprise any and all necessary structure (e.g., hardware and/or software) to execute the various methods described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of performing transmission power adjustment for an access terminal in a wireless communication environment, comprising:
   monitoring variations in a parameter which comprises a mean received power level associated with a superframe preamble of a signal which is received at the access terminal;
   comparing a mean received power level for a current superframe preamble to a mean received power level for a preceding superframe preamble; and
   determining a scalable power offset factor based upon the comparison that targets a given performance level.

2. The method of claim 1, wherein the signal further comprises channel quality index (CQI) signal erasure rate indicators from at least one base station in an active set of the access terminal and the parameter further comprises an erasure rate experienced by the at least one base station.

3. The method of claim 2, further comprising receiving the erasure rate indicators over a channel quality index feedback channel in response to a CQI signal transmitted from the access terminal and calculating the erasure rate experienced by the at least one base station.

4. The method of claim 3, further comprising determining the scalable power offset factor as a function of a desired erasure rate and an erasure rate experienced by a base station to which the access terminal is requesting a handoff.

5. The method of claim 4, further comprising transmitting a handoff request at an assigned transmission power level multiplied by the scalable power offset factor.

6. The method of claim 1, wherein the performance level is a target CQI signal erasure rate.

7. The method of claim 1, further comprising adjusting transmission power level for access terminal transmissions based upon the scalable power offset factor.

8. The method of claim 7, wherein the adjustment is performing using a linear transition from a current transmission power level to a target transmission power level over a specified period of time.

9. A method of performing transmission power adjustment for an access terminal in a wireless communication environment, comprising:
monitoring variations in a parameter of a signal received at the access terminal, wherein the signal comprises superframe preamble information and the parameter is a mean received power level of the superframe preamble;
comparing a mean received power level for a current superframe preamble to a mean received power level for a preceding superframe preamble;
determining a scalable power offset factor based upon the comparison that targets a given performance level; and
adjusting transmission power level for access terminal transmissions based upon the scalable power offset factor,
wherein the scalable power offset factor causes adjusting transmission power level for the access terminal transmissions by an amount proportional and opposite to a difference between the mean received power level of the current superframe preamble and the mean received power level of the preceding superframe preamble.

10. The method of claim 1, further comprising utilizing a closed-loop power control technique for default power control and determining the scalable power offset factor upon a determination that a change in the monitored parameter has exceeded a predetermined threshold.

11. An apparatus that facilitates scalably power-boosting a transmission power level for an access terminal in a wireless communication environment, comprising:
a receiver that receives a first signal;
a processor that measures a parameter which comprises a mean received power level associated with a superframe preamble of the first signal which is received at the access terminal, the processor compares a mean received power level for a current superframe preamble to a mean received power level for a preceding superframe preamble and determines a scalable power offset factor based upon the comparison that targets a desired performance level; and
a transmitter that transmits a second signal at an assigned transmission power level multiplied by the scalable power offset factor.

12. The apparatus of claim 11, wherein the signal further comprises channel quality index (CQI) signal erasure rate indicators from at least one base station in an active set of the access terminal and the parameter further comprises an erasure rate experienced by the at least one base station.

13. The apparatus of claim 12, wherein the receiver receives the erasure rate indicators over a channel quality index feedback channel in response to a CQI signal transmitted by the transmitter and the processor calculates the erasure rate experienced by the at least one base station.

14. The apparatus of claim 13, wherein the processor generates the scalable power offset factor as a function of a desired erasure rate and an erasure rate experienced by a base station to which the access terminal is requesting a handoff.

15. The apparatus of claim 14, wherein the transmitter sends a handoff request at an assigned transmission power level multiplied by the scalable power offset factor.

16. An apparatus that facilitates scalably power-boosting a transmission power level for an access terminal in a wireless communication environment, comprising:
a receiver that receives a first signal;
a processor that measures a parameter of the signal, wherein the first signal comprises superframe preamble information and the parameter is a mean received power level of the superframe preamble, the processor compares a mean received power level for a current superframe preamble to a mean received power level for a preceding superframe preamble and determines a scalable power offset factor based upon the comparison that targets a desired performance level; and
a transmitter that transmits a second signal at an assigned transmission power level multiplied by the scalable power offset factor,
wherein the scalable power offset factor causes a transmission power level for the second signal to adjust by an amount equal and opposite to a difference between the mean received power level of the current superframe preamble and the mean received power level of the preceding superframe preamble.

17. The apparatus of claim 11, wherein the processor employs a closed-loop power control technique for default power control and determining the scalable power offset factor upon a determination that a change in the monitored parameter has exceeded a predetermined threshold.

18. A wireless communication apparatus, comprising:
means for monitoring variation in a parameter which comprises a mean received power level associated with a superframe preamble of a signal which is received at an access terminal; and
means for generating a scalable power offset factor a targets a desired performance level, wherein the means for generating the scalable power offset factor compares the mean received power level for a current superframe preamble to a mean received power level for a preceding superframe preamble, the scalable power offset factor is based upon the comparison.

19. The apparatus of claim 18, wherein the means for monitoring monitors channel quality index (CQI) signal erasure rate indicators comprised by the signal from at least one base station in an active set of the access terminal and the means for generating the scalable offset power factor calculates an erasure rate experienced by the at least one base station as a function of the erasure rate indicators.

20. The apparatus of claim 19, further comprising means for receiving that receives the erasure rate indicators over a channel quality index feedback channel in response to a CQI signal transmitted from the access terminal.

21. The apparatus of claim 20, wherein the means for generating the scalable power offset factor generates the scalable power offset factor as a function of a desired erasure rate and an erasure rate experienced by a base station to which the access terminal is requesting a handoff.

22. The apparatus of claim 21, further comprising means for transmitting that sends a handoff request at an assigned transmission power level multiplied by the scalable power offset factor.

23. The apparatus of claim 18, wherein the desired performance level is a target CQI signal erasure rate.

24. The apparatus of claim 18, wherein an adjustment is performed using a linear transition from a current transmission power level to a target transmission power level over a specified period of time.

25. A wireless communication apparatus, comprising:
means for monitoring variation in a parameter of a signal received at an access terminal, wherein the signal comprises superframe preamble information and the parameter is a mean received power level of the superframe preamble; and
means for generating a scalable power offset factor a targets a desired performance level, wherein the means for generating the scalable power offset factor compares the mean received power level for a current superframe preamble to a mean received power level for a preceding superframe preamble, the scalable power offset factor is based upon the comparison,
wherein the means for generating adjusts transmission power level for access terminal transmissions based upon the scalable power offset factor, and
wherein the scalable power offset factor causes an adjustment to the transmission power level for access terminal transmissions by an amount equal and opposite to a difference between the mean received power level of the current superframe preamble and the mean received power level of the preceding superframe preamble.

26. The apparatus of claim 18, further comprising means for performing a closed-loop power control technique for default power control and determining the scalable power offset factor upon a determination that a change in the monitored parameter has exceeded a predetermined threshold.

27. A non-transitory computer-readable medium that stores computer-executable instructions for:
monitoring variations in a parameter which comprises a mean received power level associated with a superframe preamble of a signal which is received at an access terminal;
comparing a mean received power level for a current superframe preamble to a mean received power level for a preceding superframe preamble; and
determining a scalable transmission power offset factor based upon the comparison that targets a minimum performance level threshold.

28. The non-transitory computer-readable medium of claim 27, wherein the signal further comprises channel quality index (CQI) signal erasure rate indicators from at least one base station in an active set of the access terminal and the parameter further comprises an erasure rate of the CQI signal at the at least one base station.

29. The non-transitory computer-readable medium of claim 28, further comprising instructions for receiving the erasure rate indicators over a channel quality index feedback channel in response to a CQI signal transmitted from the access terminal and instructions for calculating the erasure rate experienced by the at least one base station.

30. The non-transitory computer-readable medium of claim 29, further comprising instructions for determining the scalable power offset factor as a function of a desired erasure rate and an erasure rate experienced by a base station to which the access terminal is requesting a handoff.

31. The non-transitory computer-readable medium of claim 30, further comprising instructions for transmitting a handoff request at an assigned transmission power level multiplied by the scalable power offset factor.

32. The non-transitory computer-readable medium of claim 27, wherein the minimum performance level threshold is a target CQI signal erasure rate.

33. A non-transitory computer-readable medium that stores computer-executable instructions for:
monitoring variations in a channel-quality parameter associated with a signal received at an access terminal, wherein the signal comprises superframe preamble information and the parameter is a mean received power level of the superframe preamble;
comparing a mean received power level for a current superframe preamble to a mean received power level for a preceding superframe preamble
determining a scalable transmission power offset factor based upon the comparison that targets a minimum performance level threshold; and
comprising adjusting transmission power level for access terminal transmissions based upon the scalable power offset factor,
wherein the adjustment is performing using a linear transition from a current transmission power level to a target transmission power level over a specified period of time, and
wherein the scalable power offset factor causes adjusting transmission power level for access terminal transmissions by an amount equal and opposite to a difference between the mean received power level of the current superframe preamble and the mean received power level of the preceding superframe preamble.

34. The non-transitory computer-readable medium of claim 27, further comprising instructions for utilizing a closed-loop power control technique for default power control and determining the scalable power offset factor upon a determination that a change in the monitored parameter has exceeded a predetermined threshold.

35. A processor that executes computer-executable instructions for scalably adjusting transmission power for an access terminal in response to channel conditions, the instructions comprising:
monitoring variations in a parameter which comprises a mean received power level associated with a superframe preamble of a signal which is received at the access terminal;
comparing a mean received power level for a current superframe preamble to a mean received power level for a preceding superframe preamble; and
determining a scalable transmission power offset factor, as a function of the monitored variations, that targets a minimum performance level threshold.

36. The processor of claim 35, wherein the signal further comprises channel quality index (CQI) signal erasure rate indicators from at least one base station in an active set of the access terminal and the parameter further comprises an erasure rate calculated as a function of the erasure rate indicators.

37. The processor of claim 36, the instructions further comprising receiving the erasure rate indicators over a channel quality index feedback channel in response to a CQI signal transmitted from the access terminal and calculating the erasure rate experienced by the at least one base station.

38. The processor of claim 37, the instructions further comprising determining the scalable power offset factor as a function of a desired erasure rate and an erasure rate experienced by a base station to which the access terminal is requesting a handoff.

39. The processor of claim 38, the instructions further comprising transmitting a handoff request at an assigned transmission power level multiplied by the scalable power offset factor.

40. The processor of claim 35, wherein the minimum performance level threshold is a target CQI signal erasure rate.

41. A processor that executes computer-executable instructions for scalably adjusting transmission power for an access terminal in response to channel conditions, the instructions comprising:
- monitoring variations in a channel-quality parameter associated with a signal received at an access terminal, wherein the signal comprises superframe preamble information and the parameter is a mean received power level of the superframe preamble;
- comparing a mean received power level for a current superframe preamble to a mean received power level for a preceding superframe preamble;
- determining a scalable transmission power offset factor, as a function of the monitored variations, that targets a minimum performance level threshold; and
- adjusting transmission power level for access terminal transmissions based upon the scalable power offset factor,
- wherein the adjustment is performing using a linear transition from a current transmission power level to a target transmission power level over a specified period of time, and
- wherein the scalable power offset factor causes adjusting transmission power level for access terminal transmissions by an amount equal and opposite to a difference between the mean received power level of the current superframe preamble and the mean received power level of the preceding superframe preamble.

42. The processor of claim 35, the instructions further comprising utilizing a closed-loop power control technique for default power control and determining the scalable power offset factor upon a determination that a change in the monitored parameter has exceeded a predetermined threshold.

43. The method of claim 1, wherein erasure rate indication information is correlated to transmission power levels to derive an appropriate power offset factor by which to multiply a transmission power assigned to the access terminal by a current serving sector.

* * * * *